Aug. 16, 1938.　　　　H. M. ADAMS　　　　2,127,456
BROKEN PIPE CLAMP
Filed April 20, 1937　　　2 Sheets-Sheet 1
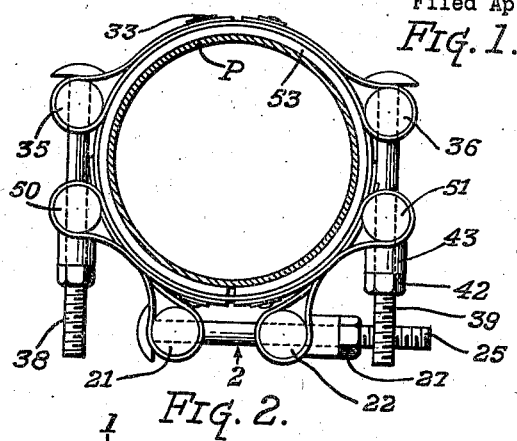
FIG. 1.
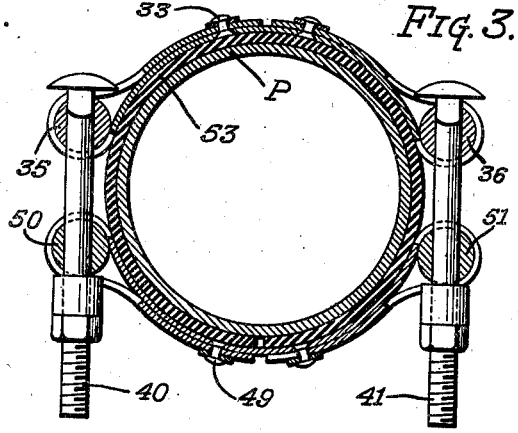
FIG. 3.
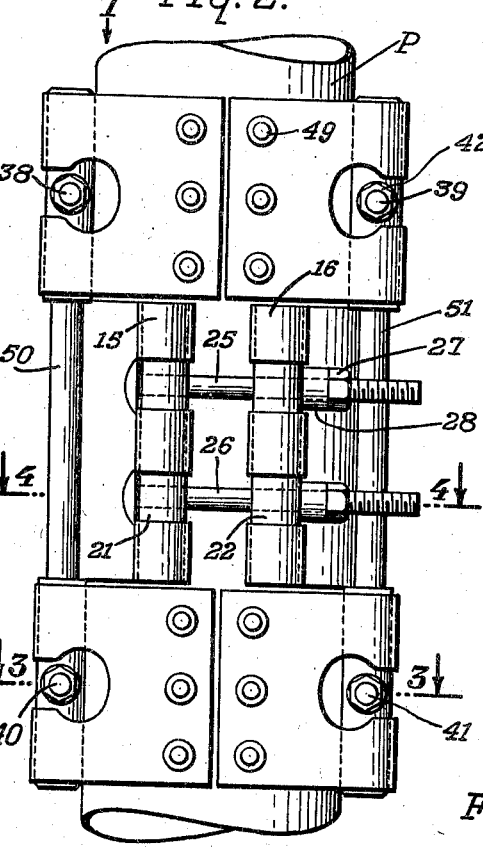
FIG. 2.
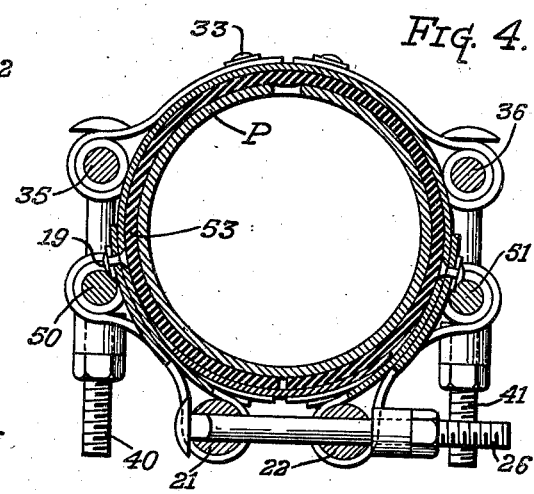
FIG. 4.
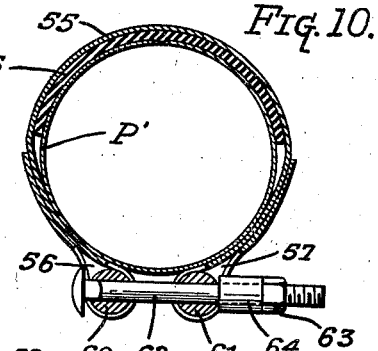
FIG. 10.
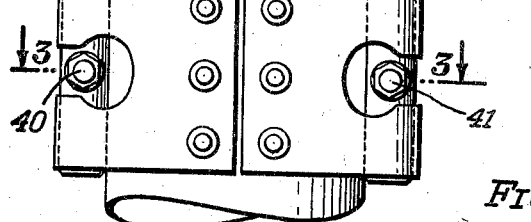
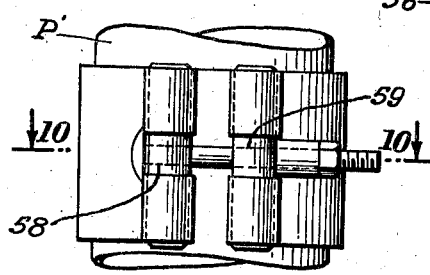
FIG. 9.
Inventor.
H. M. Adams
By Hazard and Miller
Attorneys.

Aug. 16, 1938.                H. M. ADAMS                2,127,456
                            BROKEN PIPE CLAMP
                          Filed April 20, 1937          2 Sheets—Sheet 2
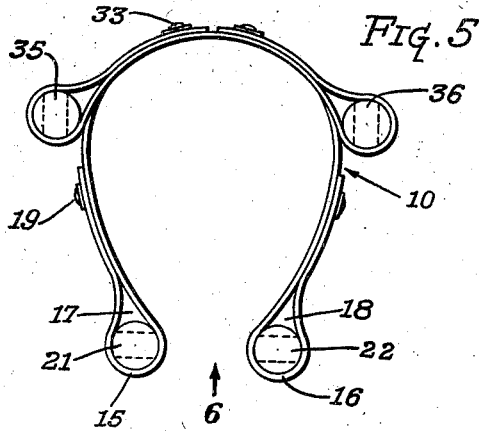
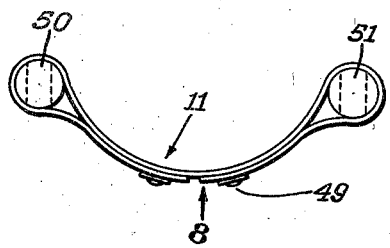
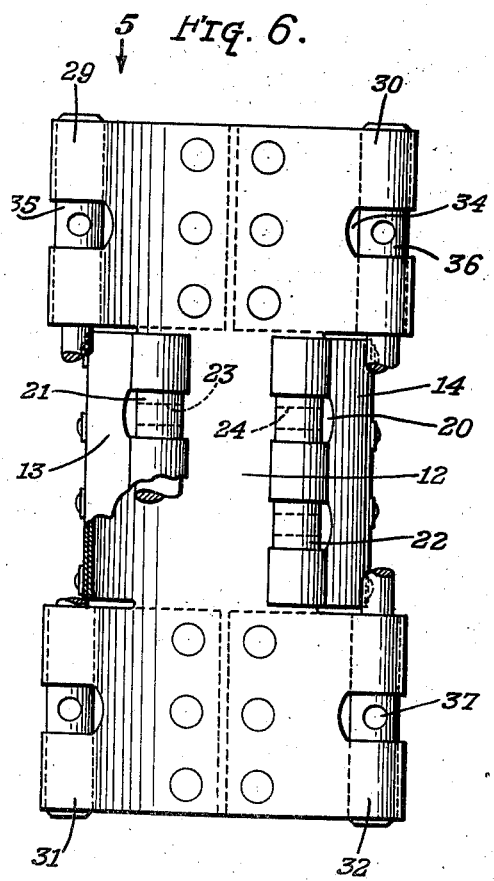
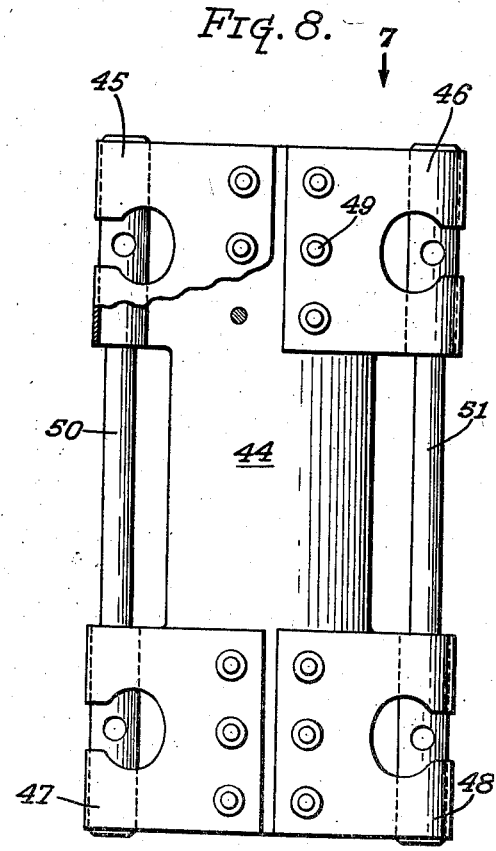
Inventor.
H. M. Adams
By Hazard and Miller
Attorneys.

Patented Aug. 16, 1938

2,127,456

UNITED STATES PATENT OFFICE 2,127,456

BROKEN PIPE CLAMP

Henry M. Adams, Los Angeles, Calif., assignor to Adams Brothers Incorporated, Ltd., Los Angeles, Calif., a corporation of California Application April 20, 1937, Serial No. 137,974

3 Claims. (Cl. 138—99)

This invention relates to a clamp for broken or leaky pipes or similar conduits.

It frequently occurs that in pipes such as underground pipe lines and in like conduits, that leaks develop in the pipe or the pipe becomes broken. Situations are frequent wherein it is difficult to remove and replace a section of pipe forming a part of the conduit.

It is an object of the present invention to provide an improved clamp which may be applied to broken or leaky pipes or similar conduits for purposes of repair so that leakage at the leak or break as the case may be, may be effectively prevented and the necessity of removing and replacing the broken or leaking section of pipe may be obviated.

Another object of the invention is to provide a clamp for broken or leaky pipe and the like which is of relatively simple construction and which is highly durable and which may be easily and quickly applied to the pipe in such a manner as to effectively insure against continued leakage.

With the foregoing and other objects in view, which will be made manifest in the following detailed description, and specifically pointed out in the appended claims, reference is had to the accompanying drawings for an illustrative embodiment of the invention, wherein:

Figure 1 is a view in end elevation of one form of clamp embodying the invention illustrating the clamp as having been applied to a broken or leaky pipe;

Fig. 2 is a view in side elevation of the same;

Fig. 3 is a sectional view taken substantially upon the line 3—3 upon Fig. 2 in the direction indicated;

Fig. 4 is a sectional view taken substantially upon the line 4—4 upon Fig. 2 in the direction indicated;

Fig. 5 is a view in end elevation of one member forming a part of the clamp as illustrated in Figs. 1 to 4;

Fig. 6 is a view in elevation of the member shown in Fig. 5;

Fig. 7 is a view in end elevation of the opposed member forming the clamp illustrated in Figs. 1 to 4;

Fig. 8 is a plan view of the same;

Fig. 9 is a side elevation of a simplified alternative form of clamp which may be employed upon pipe having small leaks or punctures; and Fig. 10 is a sectional view taken substantially upon the line 10—10 upon Fig. 9 in the direction indicated.

Referring to the accompanying drawings wherein similar reference characters designate similar parts throughout, and particularly to that form of clamp as illustrated in Figs. 1 to 8, inclusive, the improved clamp consists of two opposed members generally designated at 10 and 11, respectively. Each member is formed of a material which has some degree of flexibility and which is preferably resistant to corrosion. A suitable material that may be employed is relatively heavy sheet copper.

The clamp member 10 is formed to present a body 12 of general U-shaped form in cross section so as to at least partially encircle the pipe P to which it is to be applied. The center portions of the sides of this body are extended as indicated at 13 and 14, respectively, and the ends of these extended side center portions are reversely bent upon themselves as indicated at 15 and 16, respectively, to form loops or knuckles 17 and 18. Their ends are riveted or otherwise attached, such as for example by spot welding as indicated at 19. The loops or knuckles 17 and 18 have openings 20 formed therethrough and are designed to receive draw bars 21 and 22 which are cylindrical in form and which are rotatable within the loops or knuckles. The draw bars 21 and 22 have aligned apertures 23 and 24 formed therein which are designed to receive draw bolts 25 and 26 so that when the clamp member 10 is applied around the pipe P, on tightening up nuts 27 against washers 28, the draw bars 21 and 22 can be drawn toward each other. As the draw bars are rotatable within their respective loops or knuckles and to that extent are floated in the knuckles, these draw bars may accommodate themselves to whatever position is required on tightening up the draw bolts 25 and 26.

The body of the clamp member 10 near its ends has its sides extended to a less degree than the side center portions 14. The sides at the ends of the body are similarly revesely bent to form knuckles or loops 29, 30, 31, and 32, and the reversely bent portions are similarly fastened as by rivets or the equivalent indicated at 33. These corner or end knuckles or loops have openings 34 formed therein and are designed to receive draw bars 35 and 36.

While it is possible to make a construction with a separate draw bar for each of the knuckles 29, 30, 31, and 32, I prefer to have a single draw bar extended through both knuckles 29 and 31 and another single draw bar extend through both knuckles 30 and 32. These draw bars are apertured as indicated at 37 to receive draw bolts 38, 39, 40, and 41 which are tightened by means of nuts 42 against washers 43.

The clamp member 11 is similarly formed of sheet copper or the equivalent and presents a narrow body portion 44 which is designed to be applied to the opposite side of pipe P from clamp member 10 and to underlie knuckles 17 and 18. At the ends of this clamp member there are formed loops or knuckles 45, 46, 47, and 48 formed by reversely bending the extended end portions of the sides of the body and riveting them as indicated at 49. These knuckles receive draw bars 50 and 51 corresponding to draw bars 35 and 36 and have apertures formed therein corresponding to apertures 37 for the reception of the draw bolts 38, 39, 40, and 41. The draw bars 50 and 51 are rotatable and to that extent are floating in their loops or knuckles.

Application of the improved clamp and its advantages are as follows: Assuming that the pipe P is either broken or is punctured as indicated, a layer of gasket material, such as for example a sheet of flexible soft rubber indicated at 53 is first wrapped around the pipe so as to cover the break or puncture. Clamp member 11 is then applied over this wrapped layer of rubber against one side of the pipe and has its draw bars 50 and 51 inserted in its loops or knuckles. Clamp member 10 is then applied around the opposite side of the pipe and in so doing the extended center side portions 13 and 14 are sprung apart. These portions are then caused to contract and to overlie the narrow center body 44 of clamp member 11. The draw bolts 25 and 26 are then inserted through the draw bars 21 and 22 and are tightened up. Draw bars 50 and 51 are thus arranged in opposition to draw bars 35 and 36. The draw bolts 38, 39, 40, and 41 are inserted through the opposed draw bars and are tightened up by means of their nuts 42.

During these tightening operations the flexibility of the clamp members enables them to conform to the shape of the pipe and the rotation of the draw bars in their respective loops or knuckles enables the draw bars to accommodate themselves to whatever position is required by the tightening of the draw bolts.

The clamp thus constructed, when applied over the wrapped layer of rubber 53, would serve to prevent leakage from the pipe and may be allowed to remain as a permanent installation on the broken or punctured pipe, thus obviating the necessity of removing and replacing a section of pipe in the conduit.

The alternative form of construction as illustrated in Figs. 9 and 10 conforms generally to the center of clamp member 10. It consists of a band of flexible sheet metal, such as for example sheet copper indicated at 55, which is adapted to at least partially encircle the pipe P'. Its ends are reversely bent upon themselves to form loops or knuckles 56 and 57, the ends being fastened as by rivets or welding. The loops or knuckles have openings 58 and 59 therein and receive draw bars 60 and 61 which are rotatable within the knuckles. A draw bolt 62 extends through apertures in the draw bars arranged opposite the openings 58 and 59 and is tightened by means of nut 63 against the washer 64. This type of clamp may be employed under circumstances where the puncture is small or where the pipe is conveying fluids under low pressures. A layer of rubber indicated at 65, is applied to the pipe over the puncture or break as the case may be and the clamp is spread apart sufficiently to enable its being applied over the pipe. The draw bolt 62 is then inserted through the apertures in the draw bars and is tightened and during the tightening the draw bars rotate within their respective knuckles sufficiently to accommodate themselves to the positions required on tightening.

From the above described constructions it will be appreciated that an improved clamp for broken or punctured pipe is provided which is of relatively simple construction and which can be easily manufactured and installed. As the body of the clamp is formed of flexible material it may flex and conform itself to the pipe. On tightening the draw bolts, the draw bars will float or rotate within their respective knuckles so that the clamp can be severely tightened without setting up in the body of the clamp undesirable or destructive stresses such as for example bending moments.

Various changes may be made in the details of construction without departing from the spirit or scope of the invention as defined by the appended claims.

I claim:

1. A clamp for broken or leaky pipe and the like comprising two opposed clamping members having some degree of flexibility, one member having a body the center portions of the sides of which are extended so as to largely encircle a pipe and the end portions of the sides of which are not so far extended, the other member having a body adapted to underlie the center portions of the sides of the first member and end portions arranged in opposition to the end portions of the sides of the first member, means for drawing the center portions of the sides of the first member together and means for drawing the end portions of the members which are opposed together.

2. A clamp for broken or leaky pipe and the like comprising two opposed clamping members having some degree of flexibility, one member having a body the center portions of the sides of which are extended so as to largely encircle a pipe and the end portions of the sides of which are not so far extended, the other member having a body adapted to underlie the center portions of the sides of the first member and end portions arranged in opposition to the end portions of the sides of the first member, bars connecting the end portions of each member on each side thereof, means for drawing the opposed bars toward each other, and means for drawing the center portions of the sides of the first member together.

3. A clamp for broken or leaky pipe and the like comprising two opposed clamping members having some degree of flexibility, one member having a body the center portions of the sides of which are extended so as to largely encircle a pipe and the end portions of the sides of which are not so far extended, the other member having a body adapted to underlie the center portions of the sides of the first member and end portions arranged in opposition to the end portions of the sides of the first member, bars rotatably mounted on the center portions of the sides of the first member, draw bolts extending through said bars for drawing them toward each other, draw bars rotatably mounted upon the end portions of the sides of each member and draw bolts extending through the latter draw bars which are opposed for drawing them toward each other.

HENRY M. ADAMS.